INVENTOR
EDWARD M. CONNELLY
BY Hurvitz, Rose & Greene
ATTORNEYS

INVENTOR
EDWARD M. CONNELLY
BY Hurvitz, Rose & Greene
ATTORNEYS

INVENTOR
EDWARD M. CONNELLY

BY Hurvitz, Rose & Greene

ATTORNEYS

INVENTOR
EDWARD M. CONNELLY
BY Hurvitz, Rose & Greene
ATTORNEYS 3,535,693
Patented Oct. 20, 1970

3,535,693

TRAINABLE LOGICAL ELEMENT HAVING SIGNAL PATH SOLIDIFICATION CAPABILITIES

Edward M. Connelly, Springfield, Va., assignor to Melpar, Inc., Falls Church, Va., a corporation of Delaware

Filed Aug. 29, 1967, Ser. No. 664,180
Int. Cl. G05b *13/00;* G06f *15/18*
U.S. Cl. 340—172.5 18 Claims

ABSTRACT OF THE DISCLOSURE

A trainable logical circuit having statistical switches responsive to training signals generated by the goal circuit of a self-organizing network or system of which the circuit is a logical element, and further including a probability of decision command circuit operative in conjunction with the switch training process to selectively maintain switches in a deterministic rather than a statistical state in accordance with high frequency of usage of a given response of the network to certain logical input variables, whereby to strengthen that response by fortification or solidification of signal paths leading to that response, irrespective of a lack of complete training of all statistical switches of the circuit by the conventional training process.

BACKGROUND OF THE INVENTION

The present invention relates generally to logical elements for self-organizing networks, and more particularly to self-organizing networks incorporating path solidification techniques which allow generation of stable pathways within the organizable network or system, the networks having large input signal capacities.

In general, the self-organizing logical network is a machine intelligence system capable of adjusting its own operation to conform to a desired response to a set of external stimuli. Such networks or systems have the capability of learning (i.e., or being trained) to respond in the desired manner by continuous internal assessment of past network reaction to the same stimuli and comparison of the reactions with a specified preprogrammed or dynamically variable objective or "goal" function. In particular, the network's behavioral pattern relative to a specific set of stimuli may be internally self-adjusted in a statistical fashion in accordance with training signals generated as a result of the aforementioned comparison and indicative of "good" or "bad" reactions to the stimuli.

Typically, the self-organizing network contains, among other components, a plurality of statistical decision elements which are adaptive to respond to inputs (e.g., electrical signals) representative, for example of physical conditions such as the reaction of a controllable element to its local environment, these inputs applied to the network from suitable sensors or transducers, and to respond as well to training signals indicative of whether or not the network is making decisions in accordance with the desired objective. The determination of whether a proper decision has been made, or whether the network is tending to make the proper decision, is usually accomplished by reference to the manner in which a controlled device, often referred to as a "plant," is responding to control signals generated as an output from the organizable network.

The training signals are characterized in the art as being of either a reward or a punishment nature, indicative respectively of an improvement or of a reduction in performance in terms of reaction of the network to its inputs, relative to its immediately past performance. These training signals are generated by a goal circuit whose function is to organize the network toward a specific objective. To this end, the goal circuit is provided with a set of criteria which may be either of a static or of a dynamic nature; that is to say, fixed or variable, depending upon the particular system requirements. The criteria are repetitively compared with the actual network output data, as a means of evaluating network performance and of forcing the network to perform in the desired manner.

Each decision element of the network may comprise a bilevel or multi-level switch which is operative on a statistical basis to provide a connective (or not) between element input and output terminals, in accordance with the nature of the training signal applied to the element. Thus, the name statistical switch. In one form, the switch has a plurality of possible operating states defining respective levels of probability that a network connective will be provided. Operating states are selected in accordance with the training signals supplied by the goal circuit, to appropriately vary the probability that a connective will or will not be provided.

Self-organizing networks developed in the prior art have generally been capable of satisfactory organization toward a desired objective only where the number of trainable logical elements employed therein is relatively small. Systems using a large number of elements of the artron (artificial neuron) type disclosed by Lee in U.S. Pat. 3,327,291, for example, are relatively difficult to organize because a multi-input multi-output arrangement of such elements requires a structure in which the outputs of some of the elements are fed as inputs to others of the elements. Accordingly, the path of a logical signal from a network input terminal to a network output terminal includes many such elements, each of which is a statistical device. it is readily observed, then, that the probability of retaining any signal path of the network or system decreases as the number of statistical elements along that path increases; that is to say, such a path is quite weak, and during the organization process where many elements are subject to change, the processing of goal (training) information is difficult.

Certain prior art organizable networks such as the so-called SOBLN (Self-Organizing Binary Logical Network) type, one of which is disclosed by Halpern in U.S. Pat. 3,262,101, do not employ statistical elements connected in series, but usually do require the formation of all combinations of the input signals and direction of the signals thus formed (e.g., canonical products) to separate statistical switches. This permits the efficient processing of goal information, but as a practical matter, limits the number of input variables that can be precessed by the network or system at any given time. For example, in the Halpern network the synthesis of one logical function of 40 input variables requires $2^{40}$ statistical switches.

Additional improvements from the standpoints of reduction of complexity and rapidity of training of the network are achieved by use of multi-output or multi-level statistical switches as disclosed in my copending patent application Ser. No. 483,608, entitled "Multi-Output Statistical Switch," filed Aug. 30, 1965, and commonly assigned herewith. The present invention is directed toward further improvements, but in the form of novel logical elements which may include the bilevel or multi-level statistical switches and which are especially suitable for promoting rapid organization of large self-organizing networks.

Accordingly, it is a principal object of the present invention to provide improvements in the rapidity and stability of organization of large self-organizing networks.

It is a more specific object of the invention to provide a trainable logical element for use in self-organizing networks, in which signal paths associated with a frequent response of the network to a given logical environment are strengthened or solidified despite incomplete training of statistical switches in the logical element.

SUMMARY OF THE INVENTION

Briefly, according to the present invention the trainable logical element, hereinafter sometimes referred to as a Solidatron, is constituted in a manner corresponding in part to prior art trainable logical elements, but includes a probability of decision command circuit responsive to signals indicative of frequency of usage of that element or of signal paths therein in the response of the network to certain logical stimuli. The output of the decision command circuit can be effective to override the normal statistical switch training processes such that a switch or switches are maintained in a substantially deterministic state by which frequently used signal pathways are "solidified" or strengthened.

BRIEF DESCRIPTION OF THE DRAWINGS

The above and still further objects, features and attendant advantages of the present invention will become apparent from a consideration of the following detailed description of certain preferred embodiments thereof, especially when taken in conjunction with the accompanying drawings, in which.

DESCRIPTION OF THE PREFERRED EMBODIMENTS

Figures 1, 2:
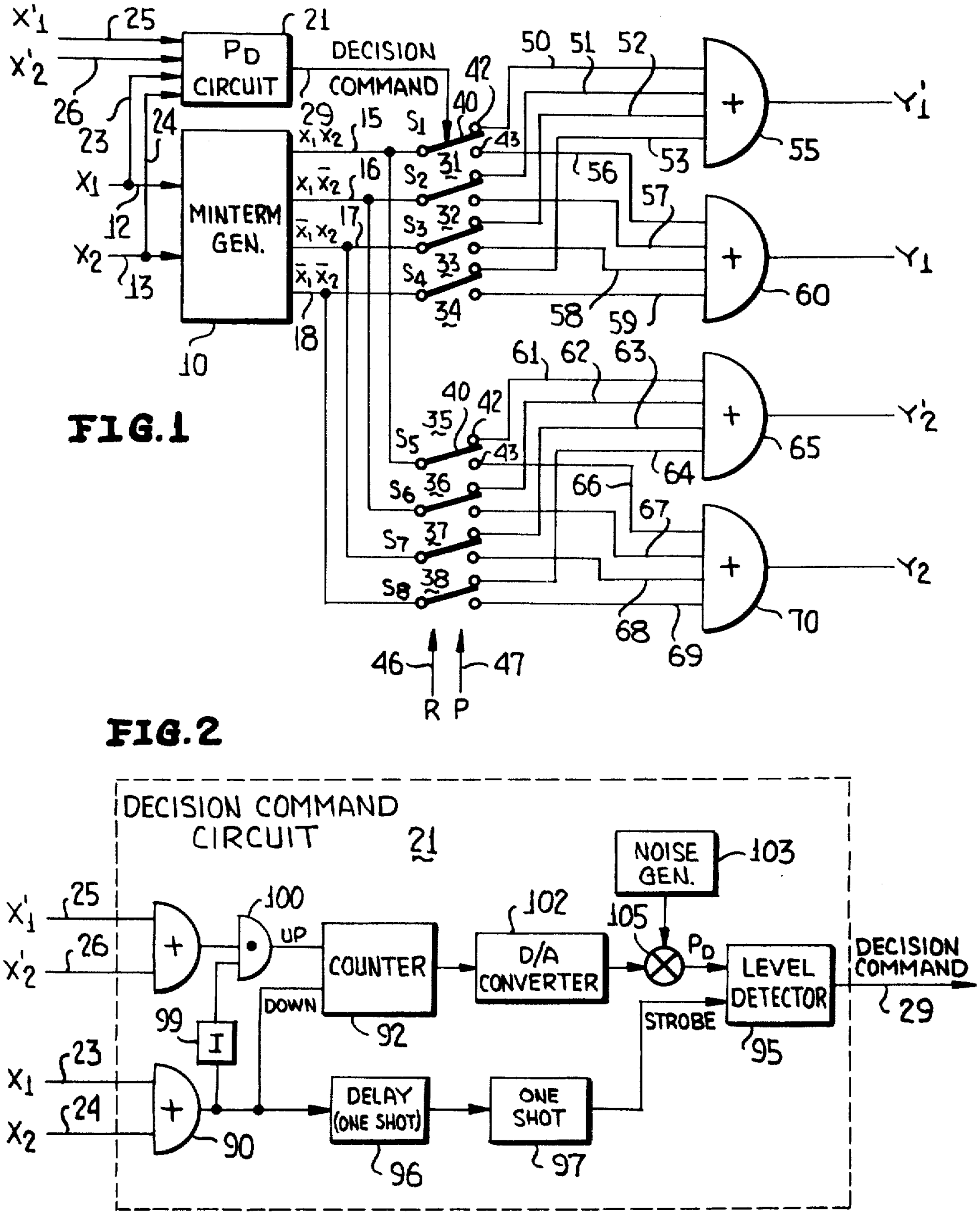
FIG. 1 is a circuit diagram of a preferred form of trainable logical element according to the present invention.
FIG. 2 is a circuit diagram of a decision command circuit for use in the logical element of FIG. 1.

Referring now to the drawings and more particularly to FIG. 1 thereof, it will be observed that the exemplary embodiment of a trainable logical device for use as a logical element in a large self-organizing network there shown is similar in many respects to logical elements which have been employed, for example, in prior art machine intelligence systems of the previously-mentioned SOBLN type. For example, logical input signals $X_1$ and $X_2$ are directed along leads 12 and 13 to a minterm generator 10 which produces the AND combinations of the input variables. Each of these AND combinations (minterms, or canonical products) is directed to a statistical switch associated with each output set, and thus, a logical element having two outputs, e.g., $Y_1$ and $Y_2$, requires two statistical switches per minterm, or more generally, $M2^N$ statistical switches, where N is the number of logical inputs and M is the number of logical outputs of the circuit.

It will be observed, then, that if one considers only minterm generator 10 which forms the AND combinations of inputs $X_1$ and $X_2$ and their respective negations or inversions $\overline{X}_1$ and $\overline{X}_2$ and feeds these combinations ($X_1X_2$, $X_1\overline{X}_2$, $\overline{X}_1X_2$, $\overline{X}_1\overline{X}_2$) along paths 15, 16, 17, 18 to conventional two-level statistical switches 31 through 38, inclusive, each having a plurality of operating states corresponding respectively to a different probability of being open or closed, and each supplying a respective path for signal, when closed, along leads 56–59 and 66–69, respectively, to OR gates 60 and 70, whereby to provide outputs $Y_1$ and $Y_2$, the circuit corresponds identically to that disclosed in the aforementioned Halpern patent. As before, the operating state of each statistical switch is controlled by reward (R) and punish (P) signals generated by a goal circuit (not shown) and applied to the several switches via respective leads 46 and 47.

It will also be apparent from a consideration of the circuit of FIG. 1 that several differences exist over the prior art SOBLN elements, for example. In particular, the present circuit includes a probability of decision ($P_D$) command circuit 21, which will subsequently be described in detail, to which status signals $X_1'$ and $X_2'$ are directed on paths 25 and 26, along with input variables $X_1$ and $X_2$ on paths 23 and 24, and from which a decision command is directed along path 29 to each of the statistical switches. In addition, each switch 31 through 38, inclusive, is provided with an "open" circuit path in which the armature 40 contacts terminal 42, as well as a "closed" circuit path in which the armature contacts terminal 43, such that the trainable logical element may generate status signals $Y_1'$ and $Y_2'$, should minterms be applied to OR gates 55 and 65 via paths 50–53 and 61–64, as well as output logic signals $Y_1$ and $Y_2$.

It is to be emphasized at this point that the electromechanical representation of the statistical switches in FIG. 1 is purely for the sake of convenience and clarity and is not to be taken as a limitation upon the form or nature of the switches. Similar considerations apply to the terminology "armature" and "contacts" as employed in the preceding description. Moreover, while signals $X_1'$, $X_2'$, $Y_1'$, and $Y_2'$ have been referred to as "status" signals, it will presently be observed that the normal input and output signals $X_1$, $X_2$, $Y_1$ and $Y_2$ are also "status" signals and that the former are employed more precisely to permit the switches and thus the overall device, to respond in a statistical manner rather than a deterministic manner. That is, the $X_1'$, $X_2'$, $Y_1'$, and $Y_2'$ signals are employed to weaken rather than to fortify or "solidify" a path for the logical input signals.

The logical element shown in FIG. 1 may be interconnected with other elements of corresponding construction in a series/parallel arrangement for a large self-organizing network such that a large number of network inputs may be accepted, and further provides a mechanism for generating stable signal paths within the network. Until a decision command is generated by circuit 21 and directed to all "active" statistical switches within that logical element, the element itself performs as a deterministic logical device. That is to say, the statistical switches retain their present state, and of course so does the element containing those switches, absent the generation of a decision command. In effect, the decision command is a direction to the element to make a new decision, whereas the absence of a decision command is an indication that a decision is not allowed. Either of these two alternative events is possible whenever an input signal is applied to the element, or at periodic intervals. A decision command causes the element to assume a logical state according to the statistical distribution accumulated from previous training, i.e., upon direction of a decision command to the element, it reverts to its statistical mode of operation (from a deterministic mode).

From the above, it is readily observed that if the probability of a decision command is near zero (i.e., $P_D \approx 0$) for all of the elements along a signal path, then there is little likelihood that any of those elements will leave their present state, and the signal path can therefore be considered rigid (solid) despite the fact that statistical switches in an element may not be biased to certainty (i.e., are not completely trained). This operation is of significant value in self-organizing networks, irrespective of network size, although additional advantages obtain for large networks because of the relative simplicity of interconnection of elements in series, parallel, or series/parallel arrangement, and because of the rapid solidification or stabilization of signal pathways in the network.

Any change in the probability that a decision command will be generated (i.e., change in $P_D$) is governed by the amount of usage of the element in the network response to its input variables. That is, if an element is along a frequently used signal path, its $P_D$ is reduced; whereas if an element is relatively unused, its $P_D$ is increased. Perhaps a better qualitative understanding of the manner in which $P_D$ is modified in an element may be achieved by consideration of a self-organizing network having a trainable logical element Z which can accept inputs from any of a plurality of elements $V_1$, $V_2$, $V_3$ . . ., $V_n$, and which can direct outputs to any of a plurality of elements $W_1$, $W_2$, $W_3$ . . ., $W_n$. Each of these elements contains its own decision command circuit. If one or more of the V elements has an input variable applied thereto, then it is possible such element or elements will direct a signal to element Z. Going further, if at least one of the V elements having an input directs an input to element Z, then element Z is "accepted." If, on the other hand, no V element having an input directs an input directs an input to element Z, the latter is "rejected." If no V element has an input, element Z is inactive and has neither an "accepted" nor a "rejected" status. $P_D$ is decreased if an element is accepted and is increased if an element is rejected. The lower the value of $P_D$, the less likely is a change in the network signal paths. This function is vaguely an analog of the human nervous system, in which repeated use of a particular response tends to strengthen (i.e., solidify) that response. In any event, this solidification process is automatic and operates in conjunction with the training process accomplished by the goal circuit generation of reward and punish signals directed to the statistical switches.

Returning now to FIG. 1, if $X_1$ and $X_2$ are binary logic signals each having the value "1," i.e., $X_1=X_2=1$, in a given interval of time, then the outputs of minterm generator 10 (the AND or product combinations) are $X_1X_2=1$; $X_1\overline{X}_2=0$; $\overline{X}_1X_2=0$; $\overline{X}_1\overline{X}_2=0$. In that instance, a logical one is applied only to statistical switches 31 and 35. If switch 31 is "closed," to permit passage of signal along path 56 to OR gate 60, output $Y_1$ is a logical "1"; but if switch 31 is "open" (i.e., the switch arm 40 rests against contact 42 in the circuit of FIG. 1), signal is directed to OR gate 55 along path 50, and $Y_1'$ is a logical "1." The truth table of $Y_1$, $Y_1'$ in binary notation is

| | | $Y_1'$ | |
|---|---|---|---|
| | | 1 | 0 |
| $Y_1$ | 1 | Not possible | $X_1X_2=1$, Switch 31 closed. |
| | 0 | $X_1X_2=1$, Switch 31 open. | $X_1X_2=0$. |

It is clear that operation of the circuitry generating outputs $Y_2$ and $Y_2'$ is similar to that analyzed above for generation of $Y_1$ and $Y_1'$, and further, that the network may be extended to provide additional outputs and to receive additional inputs in a similar manner.

Outputs $Y_1$ and $Y_2$ serve not only as logical output functions developed by the element of FIG. 1, but together with signals $Y_1'$ and $Y_2'$ are effective to inform subsequent elements of their accepted/rejected status. Thus, the reason for earlier references to "status signals." As an example, if the output terminals yielding $Y_1$ and $Y_1'$ are connected to terminals of another element, which shall be referred to as element Q, a logical "1" on the $Y_1$ path to the latter element provides an input to that element, and as well indicates that it is "accepted." That is to say, element Q lies along a network signal path, at least at this moment, and therefore has a preferred status within the network. As previously stated, the acceptance of element Q results, in a manner to be described in detail presently, in a decrease in its $P_D$ and hence a retention of its present state. In contrast, if output $Y_1'$ is a logical "1," then from the above truth table $Y_1$ must be a logical "0." Assuming that "0" represents the absence of a logical input signal to element Q, that element is unused and is informed of its "rejected" status by the presence of a logical "1" on path $Y_1'$.

The Y, Y′ signals generated by the element of FIG. 1 are similar to the X, X′ signals generated by another element and directed to leads 12, 13, 25 and 26 of the element of FIG. 1. The $X_1$ and $X_2$ are logical input signals such as binary variables and function in the usual manner for self-organizing networks. In addition, the latter signals have a "status identifying" function, together with signals $X_1'$ and $X_2'$, and for this purpose all are directed as inputs to decision command circuit 21. In response to these signals, circuit 21 may generate a decision command (or not) on output path 29 by which to exercise control over the operation of the "active" statistical switches. An active switch is one that is receiving a logical "1" at its input from the minterm generator. In the subsequent description it will be assumed that a decision command is always generated by circuit 21 and that it is a binary signal which, when a logical "1," commands each active statistical switch in the element to exercise its statistical function, i.e., to assume a logical state (open or closed) according to its memory, bias (training signal), and the laws of chance; and when a logical "0," forces the statistical switch to maintain its present state.

Referring now to FIG. 2, a circuit diagram in logic diagrammatic form of the decision command circuit 21 in the logical element of FIG. 1, the application of either $X_1$ or $X_2$ (or both) of binary "1" value to OR gate 90 is effective (a) to initiate a down count of counter 92, (b) initiate a time delayed strobe (pulse) to level detection circuit 95 via delay multivibrator 96 and pulse generator 97 (both one shot multivibrators), and (c) to inhibit the up count of counter 92 via an inverter 99 and AND gate 100.

The delayed strobe is employed to allow sufficient time for reversible (or forward-backward) counter 92 to operate and to supply a digital word to D/A (digital-to-analog) converter 102 which, in turn, generates a representative analog voltage for summation with the noise output voltage of noise generator 103 at summing node 105, and thus to supply a biased noise voltage to level detector 95. The noise generated by source 103 preferably varies in random fashion about an average or mean level of zero. Thus, at any given instant, the noise level has a 0.5 probability of being greater than zero, and the same probability of being less than zero. If the noise is D-C biased such that its average level is now greater than zero, as occurs with an "up" count of counter 92, then the probability that the noise level exceeds zero at any instant is increased from the 0.5 figure (i.e., the noise output of generator 103 will exceed zero more than 50 percent of the time, taken over a sufficiently long time interval), and that probability will continue to increase with each additional "up" count of the counter, to an upper theoretical limit of 1.0 (i.e., noise level exceeding zero 100 percent of the time). Naturally, when the probability of exceeding zero increases, the likelihood that the noise level will be less than zero is correspondingly reduced. Similar considerations are applicable to situations in which the counter is directed to count downwardly.

When a strobe pulse is received by level detector 95 it compares the biased noise level with zero; if the noise level is greater a decision command is generated; otherwise, i.e., if the noise signal is less than or equal to zero, no decision command is generated. In the present circuit a low counter state corresponds to a low probability of decision command ($P_D$), the probability $P_D$ decreasing as the number of times the element is accepted increases. As previously stated, notification of acceptance is communicated by presentation of $X_1$ and/or $X_2$ having a logical "1" value, this leading to a down count of the counter, and after a predetermined delay, initiation of a comparison by level detector 95. If both $X_1$ and $X_2$ are logical "zeroes," and either $X_1'$ or $X_2'$ (or both) is a logical "one," the element is notified of its rejected status as an up count of the counter is initiated to increase the probability of a decision command.

Figure 3:
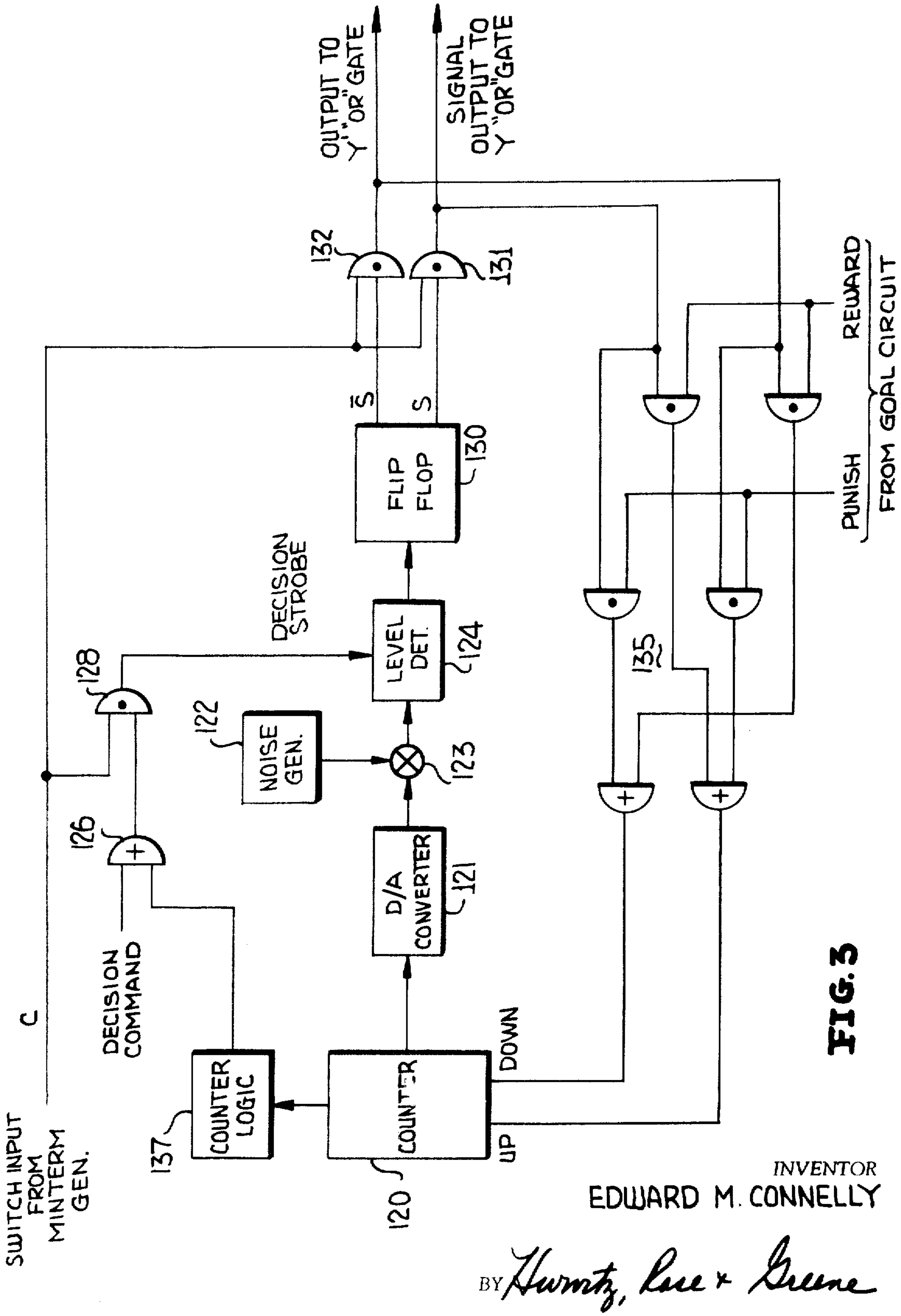
FIG. 3 is a circuit diagram of a statistical switch circuit suitable for use in the logical element of FIG. 1.

Referring now to FIG. 3, an embodiment of a statistical switch suitable for use in the trainable logical network of FIG. 1 includes a reversible counter 120, D/A converter 121, noise generator 122, summing node 123, and level detector 124, corresponding in interconnection and function to the same components employed in the decision command circuit just described. It will also be observed that the overall switch circuit bears a certain basic resemblance to that disclosed in each of the aforementioned Lee and Halpern patents. Important differences exist insofar as the latter type of switch is concerned, however, in that the present statistical switch includes a decision command input and generates a Y' output in addition to the normal Y-type output.

A logical "1" decision command applied to the statistical switch passes through OR gate 126, and if the switch is "active," i.e., has a logical "1" switch input C from the minterm generator, is gated with that switch input by AND gate 128 to provide a decision strobe (or decision trigger) to level detector 124. The level detector then operates to sample the biased noise level constituting the summed analog signal from D/A converter 121 and the noise signal from generator 122, and to compare that summation level with the zero (for example) reference level, in a manner corresponding to that described earlier in regard to the similar condition of the decision command circuit. If the biased noise voltage is greater than zero, as would occur with probabilities greater than 0.5 for the higher states (counts) of counter 120, flip-flop 130 is "set" such that ontput S thereof is a logical "1," corresponding to a "closed" condition of the switch since switch input C is then gated as a signal output to the Y output OR gate (FIG. 1) via AND gate 131. Otherwise, i.e., if the biased noise level is equal to or less than zero (as occurs with greater likelihood for the lower counter states), the flip-flop is reset such that $S=0$ and $\overline{S}=1$, corresponding to the "open" switch condition in which a logical "1" is directed to the Y' OR gate via AND gate 132.

The reward and punish signals from the network and circuit are employed to emloyed to effect counter operation leading to the desired output of the network, in accordance with the following logical equations or rules:

$$\text{Up}=C(RS+P\overline{S}) \quad (1)$$

$$\text{Down}=C(R\overline{S}+PS) \quad (2)$$

Rule 1 states, in essence, that an "up" count is to be effected by counter 120 if a reward and an S output or a punish and an $\overline{S}$ output occur with a switch input C (these being references to logical "1" values, of course). According to rule 2, a "down" count is to be performed if a reward and $\overline{S}$ output or a punish and S output occur with a switch input C. It will readily be observed that the logic gate circuitry 135 serves to implement these logical rules in the statistical switch network of FIG. 3. It will also be noted that the first rule is effective to increase the likelihood of an S output from flip-flop 130 (and hence, a Y output from the trainable logical element) since that condition of the switch is presently being rewarded, and that the second rule increases the probability of an $\overline{S}$ output which is rewarded as leading to the desired output function of the network.

If no decision command (i.e., a logical "0") is received by the switch, then it is quite clear that the switch retains its previous state, because no level detection is performed and consequently no change of state of the flip-flop can be effected. Presentation of a decision command (i.e., a logical "1"), on the other hand, directs the switch to perform its statistical function.

It is desirable, however, to provide means by which a solidified path may be partially or totally disrupted for retraining purposes. Moreover, it may happen that one or more untrained elements (i.e., elements with statistical switch probabilities at or near 0.5) form part of the signal path, a situation indicative that goal circuit information has not been utilized to form that part of the path, in which case it is desirable to detect the untrained statistical switch state and to inhibit solidification of the path through the associated element. These two situations calling for inhibition of path solidification are commonly served by use of a counter logic circuit 137 to determine whether the switch probability is at 0.5 by detection of the counter being at a midcount (which is prearranged to correspond to a probability of switch closure, at or near 0.5). If the counter is at a midcount condition, representative of an untrained state (or a state in which the switch has been set up for retraining), the counter logic circuit 137 which may be of any conventional design for this purpose, generates a logical "1" signal which is passed by OR gate 126, and assuming the switch is "active," provides a decision strobe for level detector 124. Clearly, this has the same effect as though a decision command had been applied to the active switch, i.e., inhibiting signal path solidification.

Figure 4:
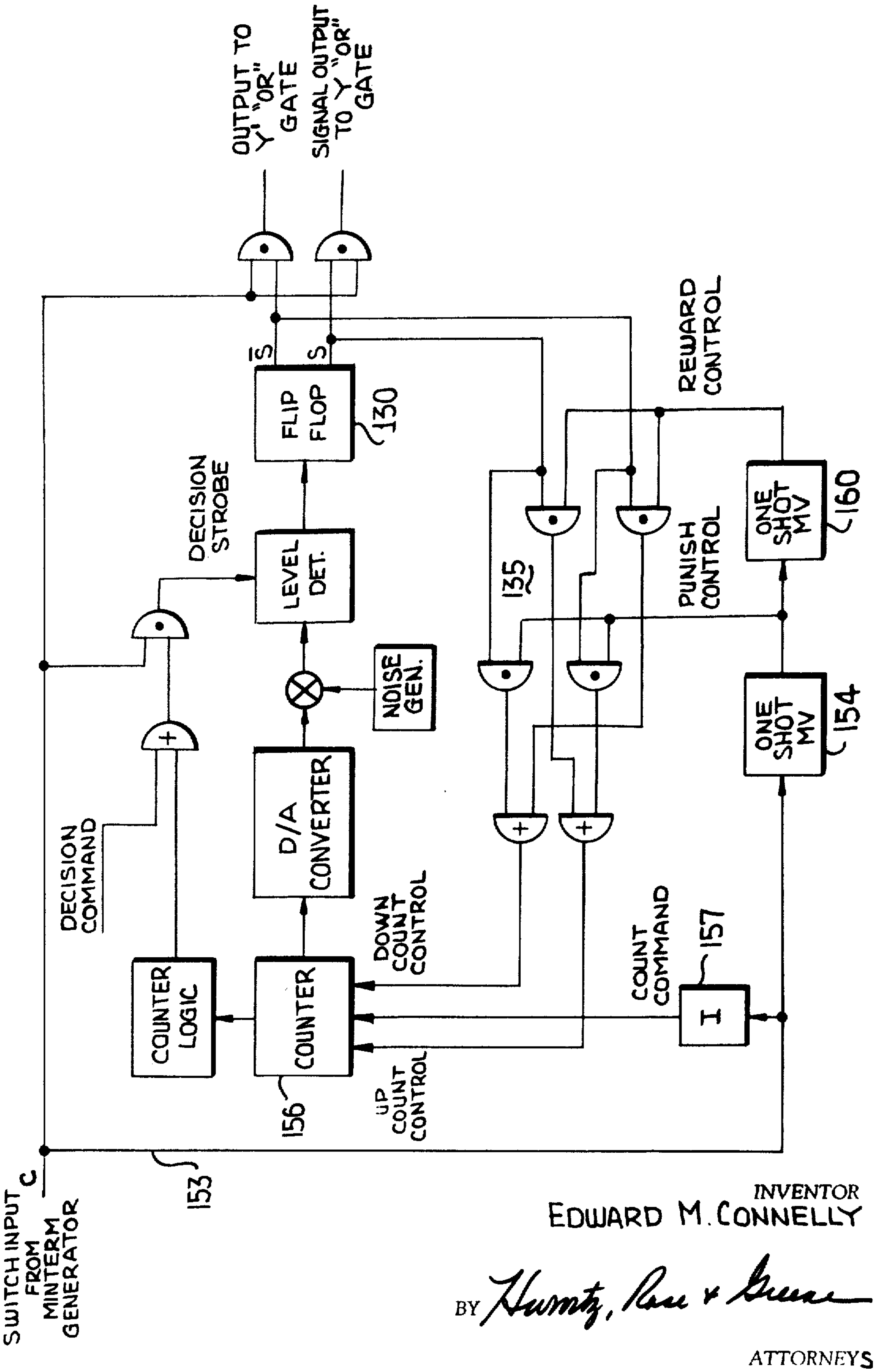
FIG. 4 is a circuit diagram of a modified form of the statistical switch of FIG. 3.

Referring now to FIG. 4, another embodiment of a statistical switch is shown in which training signals (reward and punish signals) are supplied to each statistical switch along the data signal path to each element. This structure and operation are particularly desirable for self-organizing networks composed of a large number of trainable logical elements and which would otherwise require the separate wiring of leads or connections for accommodating training signals from the goal circuit to each statistical switch.

In accordance with this aspect of the present invention, the reward and punish signals are instead applied to a coding circuit of the network, an embodiment of which will be described presently, the coding circuit conventionally arranged to encode the input pulse (i.e., binary input data signals) length according to the character of the training signals (i.e., reward or punish). Only those input signals constituting a logical "1" need be encoded, to provide coded input signals (pulses) of short and long duration, for example, corresponding to punish and reward signals respectively. This constitutes a relatively simple arrangement which is implemented much more easily than the provision of reward and punish signal paths to each statistical switch of a trainable logical element. The modification of the previously described statistical switch to effect decoding of the input signals for switch training purposes is also relatively simple, as comparison of the circuit of FIG. 4, with that of FIG. 3 will readily indicate.

Because of the many similarities between the statistical switches of FIGS. 3 and 4, and the previous detailed explanation of structure and operation of the switch of FIG. 3, it is only necessary at this point to describe that portion of the switch of FIG. 4 wherein the two switch embodiments differ. Switch input C is directed along path 153, and its leading edge triggers one shot multivibrator 154 to produce a punish control signal which is applied to logic gate circuitry 135 implementing the logical rules 1 and 2 discussed earlier. Reversible counter 156, however, is activated only upon receipt of a count command and cannot, therefore, immediately respond to the control dictated by the punish operation. If the switch input signal terminates during the interval of the pulse generated by one shot network 154, the trailing edge of the input signal produces a count command via inverter circuit 157 and the counter is stepped up or down according to the punishment logic. On the other hand, if the input signal is of long duration (i.e., coded to represent a reward) it will not terminate during the interval of the pulse output of one shot 154, and hence no count control is effected by the punish logic.

The second one shot network, 160, is triggered by the termination of the first and sets the count control logic to the reward condition. Termination of the input signal during the pulse interval of one shot 160 produces a count command to permit the counter to respond to the reward logic, the counter stepping upwardly or downwardly depending upon the condition of flip-flop 130, according to the logical rules which have been discussed.

If for some reason the input signal should terminate after the conclusion of the pulse generated by one shot network 160, the counter state is not affected because no count control lines are energized at that time.

Figures 5, 6:
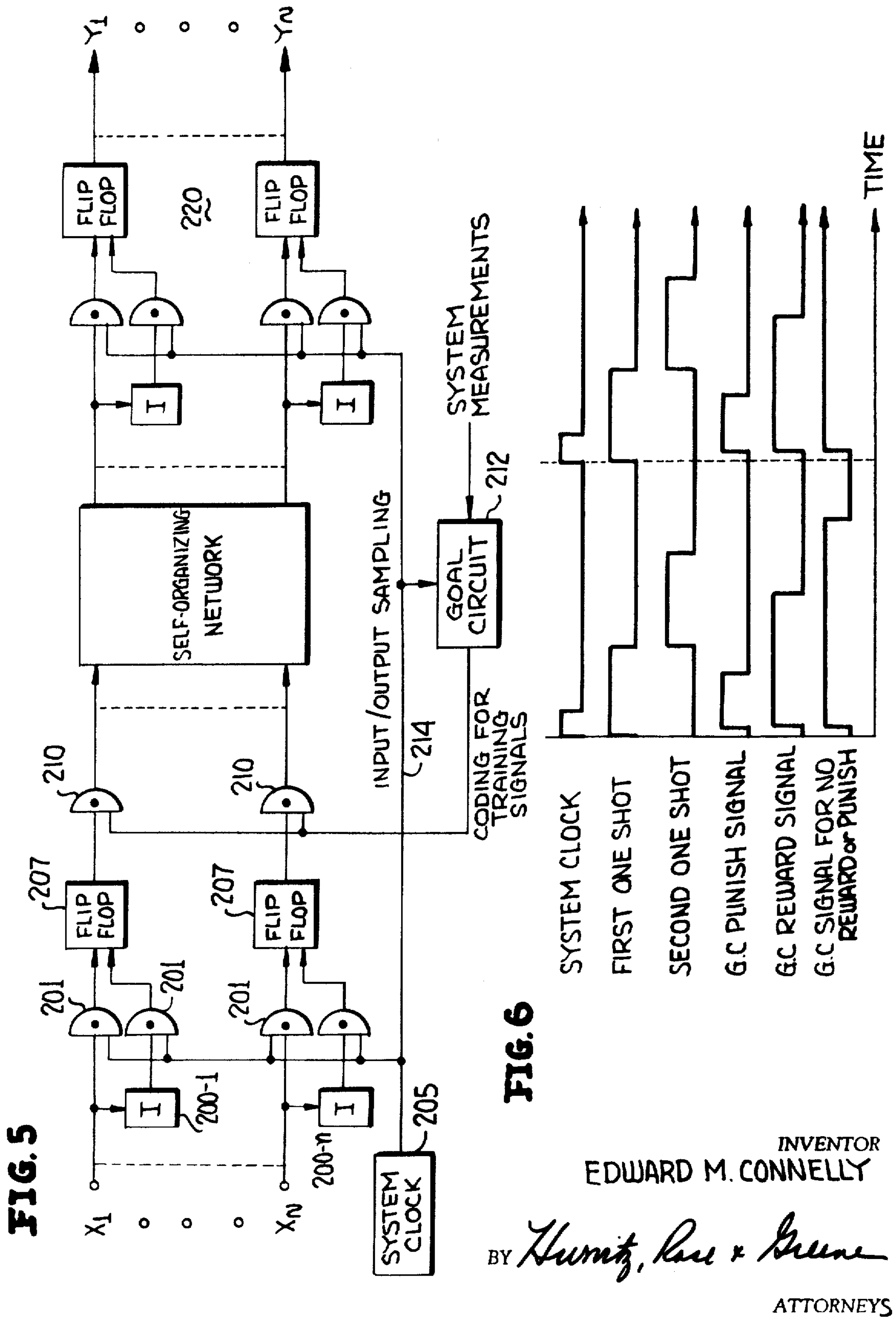
FIG. 5 is a circuit diagram of a coding and sampling network for logic networks utilizing the switch embodiment of FIG. 4.
FIG. 6 is a timing diagram helpful in describing the operation of the circuits of FIGS. 4 and 5.

Apparatus suitable for encoding the data signals to provide information for training or organizing the network toward the desired goal is shown in FIG. 5. Referring now to FIG. 5, and with concurrent reference to FIG. 6 which shows a system sampling and timing diagram for the coding and decoding of training signals, the network input signals $X_1$, $X_2$, $X_3$ . . ., $X_n$ (or their respective inversions, via inverters 200–*l* . . ., 200–*n*) are sampled by AND gate circuits 201 in accordance with coincident timing pulses generated by system clock 205. As can be seen in FIG. 6 the clock timing pulses are generated on a periodic basis, and thus the sampled input signals are stored in memory circuits comprising flip-flops 207 at periodic intervals.

The output lead of each flip-flop 207 is connected to an input terminal of a respective AND gate 210 by which to gate variable pulse duration training signals generated by goal circuit 212 in response to measurements deriving from a system controlled by the self-organizing network output signals, for example, and in accordance with the sampling pulses from clock 205 on line 214.

The input pulses, whose durations are thus modulated to provide training signal information, are directed to the self-organizing network where they are supplied in predetermined manner to the series/parallel interconnection arrangement of trainable logical elements thereof. The timing of pulses generated by the first and second one shot networks of the statistical switch (FIG. 4) and the relative durations of the goal circuit reward and punish signals (and of the no reward/no punish signal) are also shown in FIG. 6.

A sampling gate and memory system 220 (FIG. 5) similar to that used at the input of the network is employed at the network output to remove the duration modulation of the output pulses of the network.

While I have disclosed certain preferred embodiments of my invention, it will be clear that variations of the details of construction which are specifically illustrated and described may be resorted to without departing from the true spirit and scope of the invention as defined in the appended claims.

I claim:

1. In a self-organizing network adaptive to generate logical control functions of logical input signals in accordance with a desired network objective, wherein said network includes plural paths along which signals may pass, a trainable logical device, means responsive to at least some of said network input signals for applying signals to said trainable logical device, said device including means for forming a plurality of different combinations of the signals supplied by said signal applying means, switch means having a plurality of possible operating states corresponding to levels of probability of passing or blacking signals directed thereto, means operatively connected to said switch means for directing at least some of said signal combinations to said paths via said switch means, said switch means being responsive to training signals representative of the tendency of said network to operate in accordance with said desired network objective to correspondingly vary said operating states and thereby to vary the probability of passage or blockage of said different combinations of the signals, and means for stabilizing those of said paths along which a signal is passed with greater than a predetermined frequency by reducing probability that said operating states will vary in response to a future signal.

2. The combination according to claim 1 wherein said device further includes means responsive to signals passed by said switch means for developing output signals for said device, and mean responsive to blockage of signal by said switch means for developing status signals for direction to at least one further trainable logical device of said network to inform the latter device of its lack of utilization by the first-mentioned device.

3. The combination according to claim 2 wherein said stabilizing means comprises means responsive to the output signals and status signals of a preceding trainable logical device of said network for selectively inhibiting the response of said switch means to said training signals.

4. The combination according to claim 3 wherein is further included means for modulating training signal information on data signals directed to trainable logical devices of said network, to provide training signals to said switch means of the last-named trainable logical devices.

5. The combination according to claim 3 wherein is further provided means responsive to a predetermined operating state of said switch means for inhibiting stabilization of said signal paths by said stabilizing means.

6. A network adaptive to generate logical functions of digital input variables in response to training information commensurate with a desired network objective, comprising a plurality of trainable switching devices normally having controllably variable states of probability of selectively passing or blocking a signal in the form of said input variables or combinations thereof in response to said training information, and means for overriding said normal training control of said switching devices to selectively maintain the switching devices disposed along a frequently used signal path of said network in a signal-passing condition, whereby to fortify the network response in accordance with said objective irrespective of a lack of complete training of said switching devices.

7. The combination according to claim 6 wherein is provided means responsive selectively to the passage or blockage of a signal by said trainable switching devices for developing further signals representative of an accepted or a rejected status, respectively, of further elements of said network normally arranged to respond to signal passed by said switching means, and wherein said means for overriding normal training control of said switching devices comprises means responsive to said signals representative of an accepted or a rejected status from preceding elements of said network for directing selected ones of said switching devices to react to said training information by disregarding said training information when a signal representative of a predetermined character of status is received.

8. The combination according to claim 7 wherein said means for directing said switching devices is operative to react to or to disregard said training information in terms of a binary digit of appropriate value, wherein each of said trainable switching devices includes an AND gate responsive to receipt of said binary digit to require operation of the switching device to follow the directive represented by said binary digit.

9. The combination according to claim 8 wherein each said AND gate is further responsive to the binary value of the digital signal to be passed or blocked by the respective switching device, whereby only those of said switching devices in which said AND gate coincidentally receives a binary "1" as the value of both said directive and said digital signal are activated to follow said directive.

10. The combination according to claim 7 wherein each of said trainable switching devices further includes means responsive to relatively untrained states of the respective switching device for preventing the maintenance thereof in a signal-passing condition irrespective of the extent of usage of its signal path.

11. The combination according to claim 7 further including means for coding the digital signals applied to said trainable switching devices to be passed or blocked thereby, with the training information normally determining the state of probability of such passage or blockage.

12. In a self-organizing network, trainable switching circuits of the type capable of assuming any of a plurality of states of varying probability of passing or blocking digital signal applied thereto in accordance with training information based upon selected criteria of the switching circuit performance also supplied thereto, and means for encoding said training information on said digital signal as an appropriate variation of a parameter of the signal, whereby to preclude the need for separate circuit paths for supplying said training information to said switching circuits in said network.

13. The invention according to claim 12 wherein said encoding means includes means for modulating the length of each digital signal as said parameter.

14. The invention according to claim 13 wherein each of said switching circuits includes means responsive to the value of said applied digital signal for initiating the response of the respective switching circuit to said training information, and further means responsive to the duration of said applied digital signal for completing or preventing the completion of said training response according to said duration.

15. A trainable logical network, including statistical multiple condition switches responsive to training signals, and a probability of decision command circuit responsive to the conditions of said switches to selectively maintain said switches in a deterministic state as distinguished from a statistically determined state in accordance with frequency of predetermined responses of said network to predetermined training signals.

16. A trainable logical network, comprising switch training means capable of selectively establishing its own mode of operation to conform with a desired response to a set of external stimuli by continuous internal assessment of past operation in response to said stimuli on a statistical basis, said means comprising statistical switches operative to selectively complete or separate plural paths of said network in response to said internal assessment, and a probability of decision command circuit responsive to frequency of usage of any of said path for overriding said switch training means in controlling said statistical switches to maintain selected ones of said switches in a deterministic state.

17. In a trainable logical network, a set of active statistical switches, means operating said switches selectively to assume selective conditions on a deterministic basis as a logical device, a source of command signals, and means responsive to said command signals for causing said statistical switches selectively to assume selective conditions according to statistical information accumulated prior to said command signals.

18. The combination according to claim 17, wherein is provided means for establishing said statistical information selectively for each switch as a function of frequency of utilization of a circuit including that switch.

References Cited

UNITED STATES PATENTS

| | | | |
|---|---|---|---|
| 3,262,101 | 7/1966 | Halpern | 340—172.5 |
| 3,327,291 | 6/1967 | Lee | 340—172.5 |
| 3,341,822 | 9/1967 | Mirabelli | 340—172.5 |
| 3,341,823 | 9/1967 | Connelly | 340—172.5 |
| 3,374,469 | 3/1968 | Connelly | 340—172.5 |

RAULFE B. ZACHE, Primary Examiner